US012501223B2

(12) United States Patent
Fischer

(10) Patent No.: US 12,501,223 B2
(45) Date of Patent: Dec. 16, 2025

(54) METHOD FOR OPERATING A BINAURAL HEARING DEVICE, BINAURAL HEARING DEVICE AND DATA MEDIUM

(71) Applicant: Sivantos Pte. Ltd., Singapore (SG)

(72) Inventor: Eghart Fischer, Erlangen (DE)

(73) Assignee: Sivantos Pte. Ltd., Singapore (SG)

( * ) Notice: Subject to any disclaimer, the term of this patent is extended or adjusted under 35 U.S.C. 154(b) by 217 days.

(21) Appl. No.: 18/353,948

(22) Filed: Jul. 18, 2023

(65) Prior Publication Data

US 2024/0031746 A1 Jan. 25, 2024

(30) Foreign Application Priority Data

Jul. 19, 2022 (DE) ........................ 10 2022 207 373

(51) Int. Cl.
*H04R 25/00* (2006.01)

(52) U.S. Cl.
CPC ............. *H04R 25/50* (2013.01); *H04R 25/60* (2013.01)

(58) Field of Classification Search
CPC .... H04R 25/50; H04R 25/60; H04R 2430/01; H04R 2430/03; H04R 25/552; H04R 25/505; H04R 25/356; H04R 25/00; H04R 2225/43
See application file for complete search history.

(56) References Cited

U.S. PATENT DOCUMENTS 10,251,002 B2 * 4/2019 Salvetti ............... G10L 21/0224
10,575,104 B2 * 2/2020 Voigt Pedersen .... H04R 25/552
11,128,946 B2 * 9/2021 Luo .......................... H03G 3/32
2003/0028374 A1 * 2/2003 Ribic .................. G10L 21/0208 704/233
2008/0132750 A1 * 6/2008 Miller .................. H04R 25/606 600/25
2008/0152167 A1 * 6/2008 Taenzer ................. H04R 3/005 381/94.2

(Continued)

FOREIGN PATENT DOCUMENTS

CN 105679330 A * 6/2016 ......... G10L 21/0216
DE 102005043314 A1 3/2007

(Continued)

*Primary Examiner* — Oyesola C Ojo
(74) *Attorney, Agent, or Firm* — Laurence A. Greenberg; Werner H. Stemer; Ralph E. Locher

(57) ABSTRACT

A method operates a binaural hearing device having two individual devices. The individual devices each have an input transducer to receive an acoustic signal and convert it into a multi-channel input signal, impulse noise suppression to generate an attenuation curve to reduce impulse noise signal levels, an amplifier for the multi-channel signal amplification of the input signal and for generating an output signal based on the attenuation curve, an output transducer to convert the output signal into a sound signal, and a transceiver unit for signal coupling between the individual devices. In each individual device a scalar limitation value is defined from the attenuation curve. The limitation values are communicated to the respective other individual device. A common limitation value is defined from the two limitation values. The attenuation curves are limited with the common limitation value, and the signal amplification is set based on the limited attenuation curves.

10 Claims, 2 Drawing Sheets

(56) References Cited

U.S. PATENT DOCUMENTS

| | | | | |
|---|---|---|---|---|
| 2010/0057475 | A1 * | 3/2010 | Sollenberger | G10L 21/00 704/500 |
| 2011/0191101 | A1 * | 8/2011 | Uhle | G10L 21/0208 704/205 |
| 2012/0265534 | A1 * | 10/2012 | Coorman | G10L 13/033 704/265 |
| 2018/0176696 | A1 * | 6/2018 | Voigt Pedersen | H04R 25/505 |
| 2019/0182575 | A1 * | 6/2019 | Julstrom | H04R 1/1083 |
| 2019/0327564 | A1 * | 10/2019 | Pedersen | H04W 52/50 |
| 2019/0373359 | A1 * | 12/2019 | Luo | H03G 9/025 |

FOREIGN PATENT DOCUMENTS

| | | | | |
|---|---|---|---|---|
| EP | 3185587 | A1 | 6/2017 | |
| EP | 3337186 | A1 | 6/2018 | |
| EP | 3917157 | A1 | 12/2021 | |
| EP | 3917157 | B1 * | 12/2023 | G10L 21/0208 |

* cited by examiner

METHOD FOR OPERATING A BINAURAL HEARING DEVICE, BINAURAL HEARING DEVICE AND DATA MEDIUM

CROSS-REFERENCE TO RELATED APPLICATION

This application claims the priority, under 35 U.S.C. § 119, of German Patent Application DE 10 2022 207 373.8, filed Jul. 19, 2022; the prior application is herewith incorporated by reference in its entirety.

FIELD AND BACKGROUND OF THE INVENTION

The invention relates to a method for operating a binaural hearing device having two individual devices. The individual devices in each case have at least one input transducer to receive an acoustic signal and convert it into a multi-channel input signal, an impulse noise suppression to generate an attenuation curve to reduce impulse noise signal levels in the input signals, a signal processing device for the multi-channel signal amplification of the input signals and for generating an output signal, an output transducer to convert the output signal into a sound signal, and a transceiver unit for the signal coupling between the individual devices. The invention further relates to a binaural hearing device and software on a data medium to carry out the method.

Hearing aids are portable hearing devices which serve to provide care for persons with impaired or damaged hearing. In order to meet the numerous individual needs, different types of hearing aids such as behind-the-ear (BTE) hearing devices, hearing devices with an external receiver (RIC: receiver in the canal) and in-the-ear (ITE) hearing devices, e.g. also concha hearing devices or canal hearing devices (ITE, CIC: in-the-ear, CIC: completely-in-channel, IIC: invisible-in-the-channel), are also provided. The hearing devices listed by way of example are worn on the outer ear or in the auditory canal of a hearing aid user. In addition, however, bone-conduction hearing aids, implantable or vibrotactile hearing aids are also available on the market. The damaged hearing is stimulated either mechanically or electrically.

In principle, the essential components of hearing devices of this type are an input transducer, an amplifier and an output transducer. The input transducer is normally an acousto-electrical transducer, such as, for example, a microphone, and/or an electromagnetic receiver, for example an induction coil or a (radio frequency, RF) antenna. The output transducer is mainly an electro-acoustic transducer, for example implemented as a miniature loudspeaker (receiver), or as an electromechanical transducer, such as, for example, a bone-conduction receiver. The amplifier is normally integrated into a signal processing device. Energy is normally supplied by a battery or a rechargeable accumulator.

The input signals received by the input transducers are typically multi-channel, which means that the input signals are divided into a plurality of individual frequency channels, wherein each frequency channel covers a frequency band having a certain spectral width. A hearing device can have, for example, 48 (frequency) channels in a frequency range between 0 kHz (kilohertz) and 24 kHz, wherein the individual signal components of the input signal in the channels are individually processable, in particular individually filterable, amplifiable and/or attenuable by means of the signal processing device.

In the case of a binaural hearing device, two individual devices of this type are worn by a user on different sides of the head so that each individual device is assigned to one ear, wherein a communication link exists between the individual devices. Data, for example, possibly even large amounts of data, are exchanged wirelessly here during operation between the hearing device on the right and the hearing device on the left ear. The exchanged data and information enable a particularly effective adaptation of the individual devices according to a respective acoustic environment. In particular, a particularly authentic ambient sound is thereby enabled for the user, and speech intelligibility is also improved, even in noisy environments.

The hearing device settings, i.e. one or more hearing device parameters and/or a hearing device power, are set automatically during operation using different parameters or variables so that the most suitable possible hearing signal is generated for the user in every (acoustic) environment or hearing situation.

The sudden occurrence of impulse noise can have a negative effect here on the automatic setting of the hearing device parameters and/or the hearing device power. Impulse noise is to be understood here to mean, in particular, an acoustic noise event with a very fast or sudden signal level rise time (less than 0.2 s) which has large signal components at certain frequencies. Impulse noise occurs, in particular, in the event of banging noises, such as, for example, hand-clapping, clattering of crockery, or a slamming door. Impulse noise signals of this type are attenuated by particular algorithms, circuits and program technologies without reducing the speech quality in the output signal.

The measures for attenuating or suppressing impulse noise in the hearing device are referred to here and below in particular as an impulse noise suppression or impulse noise filtering. With an impulse noise suppression of this type, a detection method for impulse noise recognition runs permanently in the background, so that, in the event of a noise with a very quickly rising amplitude (impulse noise), the amplification of corresponding frequencies can be suppressed as instantaneously as possible in order to guarantee optimum hearing comfort. The impulse noise suppression generates an attenuation value here for each channel of the input signal, the attenuation value indicating how strongly the signal amplification of the signal processing device in the individual channels is to be attenuated or reduced for the noise in order to minimize the interfering influences of the impulse noise in the output signal. The attenuation values for all frequency channels are also referred to collectively as an attenuation curve.

In the case of binaural hearing devices, the impulse noise suppressions of the individual devices are not normally synchronized with one another, since it is not typically possible in the short time during the impulse noise to adjust the amplifications in the left and right individual devices in line with one another for a plurality of frequency bands or channels, since the transmission of, for example, 48 amplifications or attenuation values would take too long.

In practice, it may occur that the signal levels of the impulse noise captured by the individual devices differ from one another due to echo in the environment and due to the acoustic influence of the head of the wearer (head shadow, head shadowing). As a result, the impulse noise suppressions of the left and right individual devices produce different attenuation curves and therefore different amplifications for the output signals. This can result in fluctuations or deviations in the natural interaural level differences (ILD). This effect can impede the localization and spatial perception of the acoustic environment for the hearing device user. It can occur here, for example, that the level of the impulse signal in the output signal is more strongly reduced for the individual device which is located spatially closer to the impulse noise signal source than for the more distant individual device, as a result of which a change in directional perception briefly occurs for the user.

SUMMARY OF THE INVENTION

The object of the invention is to indicate a particularly suitable method for operating a binaural hearing device. In particular, changes in the spatial directional perception of the acoustic environment with the occurrence of impulse noise are intended to be reduced. The object of the invention is further to indicate a particularly suitable binaural hearing device and particularly suitable software on a data medium.

With the foregoing and other objects in view there is provided, in accordance with the invention, a method for operating a binaural hearing device having two individual devices. The individual devices in each case have: at least one input transducer for receiving an acoustic signal and for converting the acoustic signal into a multi-channel input signal, an impulse noise suppression for generating an attenuation curve to reduce impulse noise signal levels in the multi-channel input signal, an amplifier for multi-channel signal amplification of the multi-channel input signal and for generating an output signal on a basis of the attenuation curve, an output transducer for converting the output signal into a sound signal, and a transceiver unit for signal coupling between the individual devices. The method includes the steps of: defining, in each of the individual devices, a scalar limitation value from a respective attenuation curve, communicating scalar limitation values to a respective other individual device, defining a common limitation value from the scalar limitation values being two scalar limitation values, limiting attenuation curves with the common limitation value, and setting signal amplification on a basis of limited attenuation curves.

In terms of the method, the object is achieved according to the invention with the features of the independent method claim and in terms of the binaural hearing device with the features of the independent binaural hearing device claim, and in terms of the software with the features of the independent software claim. Advantageous embodiments and developments form the subject-matter of the dependent claims.

The advantages and embodiments described with regard to the method are transferable accordingly to the hearing device and/or the software and vice versa.

Insofar as method steps are described below, advantageous embodiments are provided for the hearing device in particular in that the hearing device is designed to carry out one or more of these method steps.

The method according to the invention is provided for operating a binaural hearing device and is suitable and designed for that purpose. The hearing device is configured as binaural and has two individual devices here which in each case have at least one input transducer, an impulse noise suppression, a signal processing device, a transceiver unit and at least one output transducer, and are designed to receive sound signals from the environment and output them to a user of the hearing device. The aforementioned device components are, in particular, accommodated in each case in an (individual) device housing of the hearing device. The device housings are configured in such a way that they can be worn by the user on the head and close to the ear, e.g. in the ear, on the ear or behind the ear. The hearing device is configured, for example, as a BTE hearing device, an ITE hearing device or an RIC hearing device.

In the case of a binaural hearing device, the two individual devices are worn by the user on different sides of the head, so that each individual device is assigned to one ear. The individual devices are configured by means of a wireless interface formed by the transceiver units for signal data exchange.

The hearing device serves, in particular, to provide care for a user with impaired hearing (hearing device user). The hearing device is configured here to receive sound signals from the environment and output them to a user of the hearing device. To do this, the hearing device has at least one input transducer, in particular an acoustic-electrical transducer, such as, for example, a microphone. During the operation of the hearing device, the input transducer receives sound signals (noises, tones, speech, etc.) from the environment and converts them in each case into an electrical input signal. The input signal is configured here as a multi-channel signal. In other words, the acoustic signals are converted into a multi-channel input signal. The input signal therefore has a plurality of frequency channels, in particular at least two, preferably at least 20, particularly preferably at least 40, for example 48 (frequency) channels, which in each case cover an assigned frequency band of a frequency range of the hearing device. A frequency range between 0 kHz and 24 kHz, for example, is divided into 48 channels so that input signals having 48 channels are generated.

The individual devices in each case have an output transducer, in particular an electro-acoustic transducer, such as, for example, a receiver. An electrical (multi-channel) output signal is generated from the electrical (multi-channel) input signal by modifying (e.g. amplifying, filtering, attenuating) the input signal or the individual frequency channels or signal channels in a signal processing device.

An impulse noise suppression (impulse noise filtering) which is integrated, for example, into the signal processing device is provided in each case in the individual devices in order to attenuate or suppress impulse noise. For signaling purposes, the impulse noise suppression is preferably connected upstream of a (signal) amplifier of the signal processing device.

The impulse noise suppression is provided and configured to detect the occurrence of impulse noise in the channels of the input signal and in each case to generate an attenuation value for the channels which reduces the signal amplification of the amplifier for the respective channel by the attenuation value. The occurrence of impulse noise can be detected here, for example, by means of a very quickly (<0.2 s) rising signal amplitude (signal level). The set of the attenuation values for a plurality or for all channels of the input signal is referred to below as the attenuation curve. If no impulse noise is detected, the attenuation values have, for example, a value of 0 dB (decibels), so that the signal amplification in the signal processing device or in the amplifier is not affected. In the event of an impulse noise, the attenuation values can have, for example, have a value of −20 dB to −40 dB, wherein the subsequent signal amplification is attenuated or reduced by this value. The attenuation curves generated by the impulse noise suppression during the operation of the hearing device thus reduce the impulse noise signal levels in the amplified input signals or output signals.

According to the method, a scalar limitation value is determined in each individual device from the respective attenuation curve. In other words, a single scalar limitation value is determined from the plurality, for example, 48, of attenuation values. The limitation value can be determined here from the complete attenuation curve for all channels, or for only a (partial) attenuation curve of the channels affected by the impulse noise. An impulse noise of a slamming door, for example, has a higher proportion of signal components in the low-frequency bands or channels, whereas a clattering of crockery has more signal components in higher-frequency channels.

The limitation values of the individual devices are then communicated to the respective other individual device, wherein a common, (pseudo-) synchronized limitation value is determined in each case from the limitation values of both individual devices. This common or synchronized limitation value is then used to limit the attenuation curves. In other words, the synchronized limitation value is used, in particular, as a lower threshold value, wherein, if the attenuation values or the attenuation curve attain or fall below the limitation value, they are restricted or limited to the limitation value. The limited attenuation curve or the limited attenuation values is/are used to set the signal amplifications in the signal processing device.

The method accepts that, due to the synchronized limitation value, one of the individual devices may not adequately attenuate the impulse noise in the output signal. However, the method hereby ensures that the directional perception of the user is not adversely affected by an impulse noise. The localization and spatial perception of the acoustic environment are thereby improved. In particular, no fluctuations or deviations in the natural interaural level differences (ILD) occur, so that a particularly suitable method for operating a binaural hearing device is implemented.

The aim of the method according to the invention is not to synchronize the exact amplifications in the frequency bands (channels), but to synchronize a scalar (broadband) limitation value which predefines a maximum attenuation value for all channels. The previously essentially unlimited attenuation values of a relevant number of frequency bands (the bands with the highest desired attenuation) are thereby restricted to the same limitation value if this value is attained or exceeded/understepped.

The problem of a very fast synchronization (in the microsecond range) of multi-channel amplifications on both ear sides is thus solved according to the invention by a (pseudo-) synchronization in which a single limitation value is transmitted between individual devices. The limitation values correspond here essentially to an expected (estimated, extrapolated) value for the respective next impulse noise (impulse event), wherein the limitation values between the impulse noises are transmitted and synchronized between the individual devices. The synchronized limitation value applies here essentially to the next impulse noise only. The method is based here on the assumption that a further (future) impulse noise will have an amplitude or signal level comparable to the current (past) impulse noise, as in the case, for example, of hand-clapping or clattering of crockery. If this assumption is satisfied, the applied attenuation values are limited in the relevant frequency ranges (those with the most-desired attenuation) to the synchronized maximum attenuation value (limitation value) in both individual devices and are therefore even and flat. This evenness or flatness of the attenuation curve (same attenuation value for different frequencies) is a further advantage of the method: it prevents distortion of the frequency shape of the impulse noise, at least over the frequency range and during the time in which the synchronized limitation value is applied.

Only one scalar limitation value is preferably exchanged in each case between the individual devices. However, it is similarly conceivable for the frequency channels of the individual devices to be subdivided into at least two frequency bands or frequency segments, and for a scalar value to be determined and exchanged in each case for each frequency band or each frequency segment. The frequency channels are subdivided, for example, into high frequencies and low frequencies, wherein low frequencies cover, for example, the frequency range of a slamming door, and high frequencies cover, for example, the frequency range of clattering crockery. It is essential that the number of scalar limitation values exchanged between the individual devices is significantly reduced compared with the number of frequency channels so that a fast (pseudo-) synchronization of the individual devices is enabled. The individual devices in each case transmit, for example, fewer than five scalar limitation values, in particular fewer than three scalar limitation values, preferably only one scalar limitation value.

If no impulse noise occurs for a lengthy period, the probability of the next impulse noise being connected in any way to the preceding impulse noise will be reduced. In one suitable embodiment, the common or synchronized limitation value is set to a stored default value after a predefined time period. For example, as the time between the impulse noises increases, the synchronized limitation value slowly or successively assumes a stored or predefined initial or default value, for example 20 dB. After a predefined time period, when the probability of the next impulse noise being connected to the preceding impulse noise is sufficiently low, the synchronized limitation value is therefore forgotten ("forgetting factor"). The time period or probability that is deemed to be sufficient here and the specific probability level are initially irrelevant. This can be determined, for example, from past data or from corresponding experiments or trials. Different time periods may possibly be applied to different impulse noise events (door slamming, hand-clapping, etc.), environmental/hearing situations or application scenarios.

In one conceivable development, the common limitation value is determined by averaging the two limitation values. In other words, the limitation values are averaged to form the common or synchronized limitation value. A particularly simple, effortless definition of the common limitation value is thereby implemented.

In one preferred design, an average value and a minimum value of the associated attenuation curve are determined in each case in order to determine the individual limitation values. In other words, the attenuation values determined by the impulse noise suppression are averaged to form an average (attenuation) value, and a minimum attenuation value is determined as an (attenuation) minimum value. The limitation value is appropriately determined here in such a way that it lies between the average value and the minimum value. The average value therefore represents an upper limit or an upper threshold value, and the minimum value represents a lower limit or a lower threshold value for the limitation value. The determined limitation value is therefore always greater than the minimum value and is always less than the average value.

In one appropriate design, the limitation value is determined from the sum of the average value and the minimum value, wherein the average value and the minimum value are preferably modified by a weighting factor. The weighting factor appropriately has a value range here between zero (0) and one (1). This means that the weighting factor is greater than or equal to zero (0) and less than or equal to one ($\leq 1$).

The minimum value (min), for example, is multiplied by the weighting factor (w), wherein the average value (mean) is multiplied by a factor of one minus the weighting factor (1−w), and wherein the weighted values are added together. Expressed as a formula, the limitation value (att_bb_thr) is therefore, for example:

$$att\_bb\_thr = w*\mathrm{min} + (1-w)*\mathrm{mean}.$$

The weighting factor can be a stored or predefined value. The weighting factor is preferably constant and is dimensioned according to the respective wishes or requirements between 0 and 1, depending on whether, on average, less (average value, w=0) or more (minimum, w=1) attenuation is required. The specific value of the weighting factor is initially irrelevant. A suitable weighting factor can be determined, for example, from past data or from corresponding experiments or trials. Different weighting factors may be applied in some instances to different impulse noise events (door slamming, hand-clapping, etc.), environmental/hearing situations or application scenarios. The weighting factor can therefore be set, for example, depending on a current hearing situation.

The binaural hearing device according to the invention has two individual devices. Each individual device here has at least one input transducer to receive an acoustic signal and convert it into a multi-channel input signal, an impulse noise suppression to generate an attenuation curve to reduce impulse noise signal levels in the input signals, a (signal) amplifier for the multi-channel signal amplification of the input signals and for generating an output signal, an output transducer to convert the output signal into a sound signal, and a transceiver unit for the signal coupling between the individual devices. The impulse noise suppression and the amplifier are, for example, part of a signal processing device.

The hearing device, in particular the signal processing device or the impulse noise suppression, further has a controller, i.e. a control unit. The programming and/or circuitry of the controller is/are generally configured here to carry out the method according to the invention described above. The controller is therefore specifically configured to determine a limitation value from the attenuation values or attenuation curves and communicate it to the transceiver unit, and to determine a common or synchronized limitation value from the limitation value and the limitation value communicated by the respective other individual device and to apply the common or synchronized limitation value to the attenuation curve as a limitation or restriction.

In one preferred embodiment, the controller is formed at least in essence by a microcontroller having a processor and a data memory in which the functionality to carry out the method according to the invention is implemented in terms of programming in the form of operating software (firmware) so that the method—possibly through interaction with a hearing aid user—is carried out automatically in the microcontroller when the operating software is executed. According to the invention, however, the controller can also be formed by means of a non-programmable electronic component, such as, for example, an application-specific integrated circuit (ASIC) in which the functionality to carry out the method according to the invention is implemented using circuit technology.

An additional or further aspect of the invention provides software on a medium or data medium to carry out or execute the method described above. This means that the software is stored on a data medium, and is provided to execute the method described above, and is suitable and designed for this purpose. Particularly suitable software for the operation of the binaural hearing device is thereby implemented, with which the functionality to carry out the method according to the invention is implemented in the form of programming. The software is therefore, in particular, operating software (firmware), wherein the data medium is, for example, a data memory of the controller.

Other features which are considered as characteristic for the invention are set forth in the appended claims.

Although the invention is illustrated and described herein as embodied in a method for operating a binaural hearing device, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Matching parts and quantities are always denoted in all figures with the same reference symbols.

Figure 1:
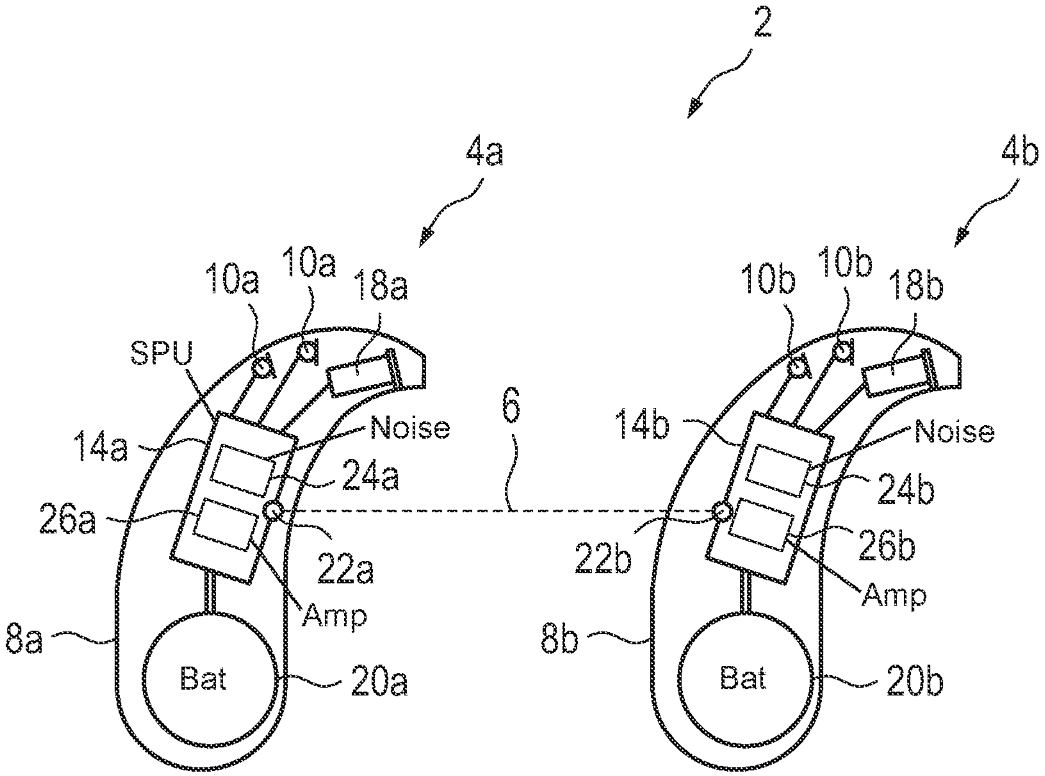
FIG. 1 is a diagrammatic illustration of a binaural hearing device having two individual devices.

Referring now to the figures of the drawings in detail and first, particularly to FIG. 1 thereof, there is shown a basic design of a binaural hearing device 2 according to the invention. The hearing device 2 is implemented here with two signal-coupled hearing aids or individual devices 4*a*, 4*b*. The individual devices 4*a*, 4*b* are configured here by way of example as behind-the-ear (BTE) hearing aids. The individual devices 4*a*, 4*b* are coupled or couplable to one another by means of a wireless signal communication connection 6.

The communication connection 6 is designed, for example, as an inductive coupling between the individual devices 4*a* and 4*b*, or alternatively the communication connection 6 can be designed, for example, as a radio connection, in particular as a Bluetooth or RFID connection, between the individual devices 4*a* and 4*b*.

The individual device 4*a* is arranged in use, for example, on the right ear of the hearing device user, wherein the individual device 4*b* is arranged accordingly on the left ear.

The design of the individual devices 4*a*, 4*b* is explained below on the basis of the individual device 4*a*, wherein the explanations are also transferable accordingly to the individual device 4*b*. The components of the individual device 4*a* are indicated here by the suffix "a", whereas the corresponding components of the individual device 4*b* are indicated in the figures by the corresponding suffix "b".

Figure 2:
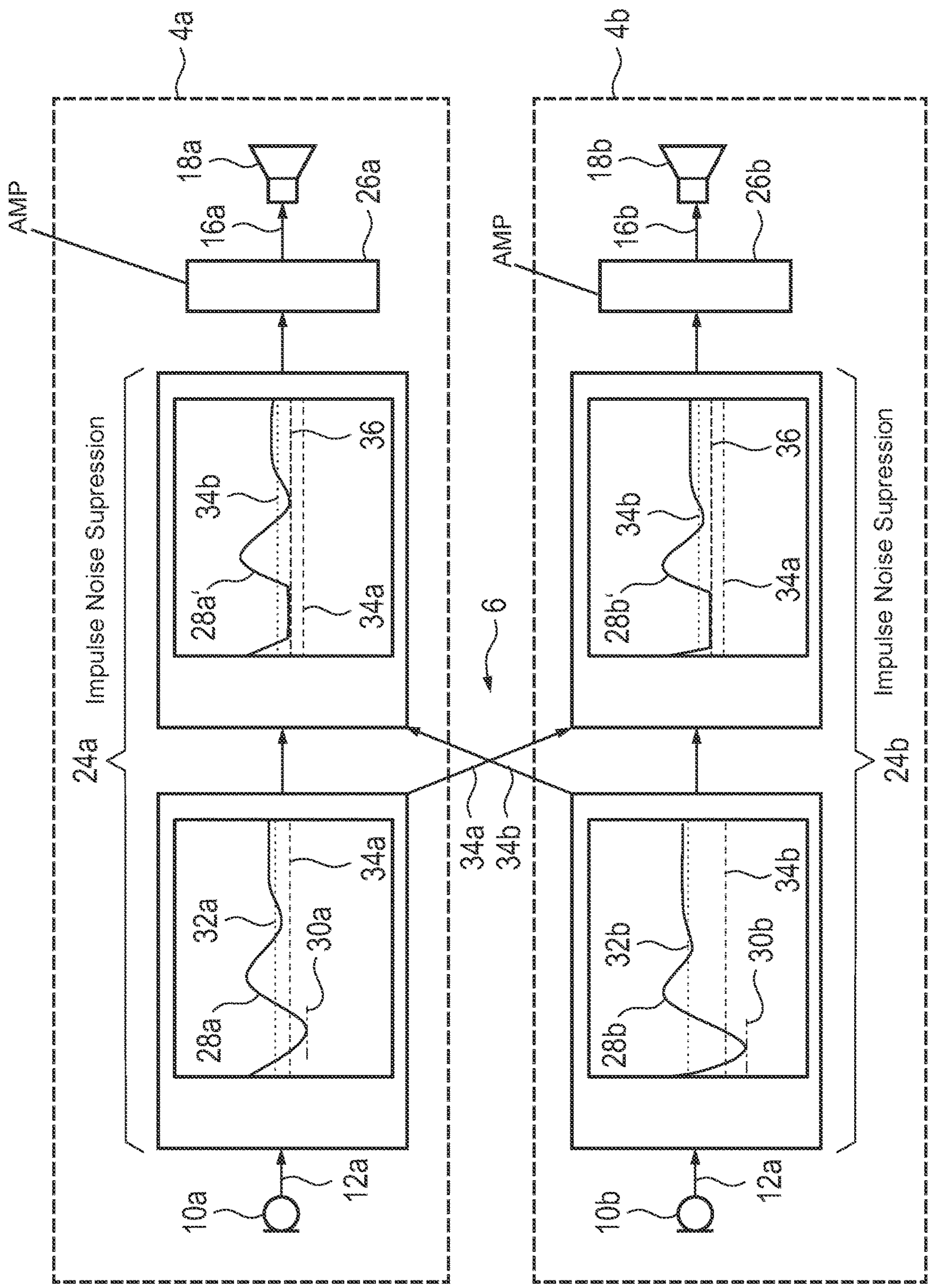
FIG. 2 is a block diagram for a functional division of a method for operating the hearing device.

As shown schematically in FIG. 1, the individual device 4*a* contains a device housing 8*a* into which one or more microphones, also referred to as (acousto-electrical) input transducers 10*a*, are installed. A sound or the acoustic signals in an environment of the hearing device 2 are received with the input transducers 10*a* and are converted into electrical, multi-channel input signals 12*a* (FIG. 2). The input signals 12*a* preferably have a plurality of frequency channels, for example 48 channels in the frequency range between 0 kHz and 28 kHz.

A signal processing unit 14*a* which is similarly integrated into the device housing 8*a* processes the input signals 12*a*. An output signal 16*a* (FIG. 2) of the signal processing unit 14*a* is transmitted to an output transducer 18*a* which is designed, for example, as a loudspeaker or receiver which outputs an acoustic signal. In the individual device 4*a*, the acoustic signal is transmitted to the eardrum of a hearing system user, possibly via a sound tube or external receiver (not shown in detail) containing an earmold positioned in the auditory canal. However, an electromechanical output transducer 20, for example, is also conceivable as a receiver, as in the case, for example, of a bone-conduction receiver.

The individual device 4*a* and, in particular, the signal processing unit 14*a*, are supplied with energy from a battery 20*a* similarly integrated into the device housing 8*a*.

The signal processing device 14*a* is provided with a signal path to a transceiver unit 22*a*. The transceiver 22*a* serves, in particular, to transmit and receive wireless signals by means of the communication connection 6.

The signal processing device 14*a* has impulse noise suppression 24*a* and a (signal) amplification or an amplifier 26*a*, and also a controller (not shown in detail) as a control device. The controller is provided here to carry out a method according to the invention for operating the hearing device 2, and is suitable and configured for this purpose. The method is explained in detail below with reference to FIG. 2.

During the operation of the hearing device 2, the input transducers 10*a*, 10*b* receive sound signals (noises, tones, speech, etc.) from the environment and convert them into electrical input signals 12*a*, 12*b*. The input signals 12*a*, 12*b* are fed to the respective impulse noise suppression 24*a*, 24*b* which examines the input signals 12*a*, 12*b* for the presence of impulse noise. In the event of an impulse noise, the impulse noise suppression 24*a*, 24*b* generates an attenuation curve 28*a*, 28*b* to control and/or regulate the multi-channel amplifier 26*a*, 26*b*.

The attenuation curves 28*a*, 28*b* are shown schematically in FIG. 2 by way of example on the basis of a frequency attenuation diagram, wherein the frequency f, for example of 0 kHz to 24 kHz, is plotted horizontally, i.e. along the x-axis, and the attenuation (gain), for example of −40 dB to 0 dB, is plotted vertically, i.e. along the y-axis. The attenuation curves 28*a*, 28*b* show here, for example, the characteristic for a slamming door, the impulse noise of which has a low tone or low frequency, so that the highest signal level—and correspondingly the lowest attenuation values—occur at low frequencies. The attenuation curves 28*a*, 28*b* have different characteristics here due to echo or head shadowing.

The controller of the respective individual device 4*a*, 4*b* determines a respective minimum value 30*a*, 30*b* and an average value 32*a*, 32*b* from the respective attenuation curve 28*a*, 28*b*. The minimum value 30*a*, 30*b* corresponds here to the lowest attenuation value of the attenuation curve 28*a*, 28*b*, i.e. to the value having the greatest attenuation for the amplification 26*a*, 26*b*, wherein the average value 32*a*, 32*b* is the averaged value of the respective attenuation curve 28*a*, 28*b*.

From the minimum value 30*a*, 30*b* and the average value 32*a*, 32*b*, the controller of the respective individual device 4*a*, 4*b* determines a scalar limitation value 34*a*, 34*b* which lies between the average value 32*a*, 32*b* and the minimum value 30*a*, 30*b*. The limitation values 34*a*, 34*b* are calculated here, in particular, according to the following formula:

$$att\_bb\_thr = w*\mathrm{min} + (1-w)*\mathrm{mean},$$

where att_bb_thr is the limitation value 34*a*, 34*b*, min is the minimum value 30*a*, 30*b*, mean is the average value 32*a*, 32*b*, and w is a weighting factor between zero and one ($0 \le w \le 1$).

The limitation values 34*a*, 34*b* of the individual devices 4*a*, 4*b* are then communicated by means of the communication connection 6 to the respective other individual device 4*b*, 4*a*. Both limitation values 34*a* and 34*b* are thus available in each case to the controllers of both individual devices 4*a*, 4*b*. The controllers determine a synchronized limitation value 36 having the same value in both individual devices 4*a*, 4*b* from the limitation values 34*a* and 34*b* through averaging. Here, the limitation value 36 is, for example, the arithmetic mean (arithmetic mean value) of the limitation values 34*a* and 34*b*.

The values for the scalar quantities of the minimum value 30*a*, 30*b*, the average value 32*a*, 32*b* and the limitation values 34*a*, 34*b*, 36 are shown schematically as dashed lines in the diagrams in FIG. 2.

The synchronized limitation value 36 is then used to limit the attenuation curves 28*a*, 28*b*. In other words, the synchronized limitation value 36 is used, in particular, as a lower threshold value, wherein all values of the respective attenuation curve 28*a*, 28*b* which attain or fall below this limitation value 36 are limited to the limitation value 36. In other words, the attenuation curves 28*a*, 28*b* are "cut off" below the limitation value 36 so that the limited attenuation curves 28*a*', 28*b*' are flattened in the area of the greatest spectral energy, so that the spectral characteristic of the impulse noise is retained with the amplification. The limited attenuation curves 28*a*, 28*b* are used to set the signal amplifications of the (frequency) channels in the amplifier 26*a*, 26*b*.

The synchronized limitation value 36 applies here essentially to the respective next impulse noise only. The method is based here on the assumption that a further (future) impulse noise will have an amplitude or signal level comparable to the current (past) impulse noise. If this assumption is satisfied, the attenuation curves 28*a*, 28*b* are limited for the future impulse noise in both individual devices 4*a*, 4*b* to the limitation value 36 so that the attenuation curves 28*a*', 28*b*' are essentially even and flat. The synchronized limitation value 36 is set to a stored default value after a predefined time period.

The claimed invention is not limited to the exemplary embodiment described above. On the contrary, other variants of the invention can be derived therefrom by a person skilled in the art within the scope of the disclosed claims without departing the subject-matter of the claimed invention. In particular, all individual features described in connection with the exemplary embodiment are further combinable in other ways within the scope of the disclosed claims without departing the subject-matter of the claimed invention.

The following is a summary list of reference numerals and the corresponding structure used in the above description of the invention.

REFERENCE SYMBOL LIST

2 Hearing device
4*a*, 4*b* Individual device
6 Communication connection
8*a*, 8*b* Device housing
10*a*, 10*b* Input transducer

12*a*, 12*b* Input signal
14*a*, 14*b* Signal processing device
16*a*, 16*b* Output signal
18*a*, 18*b* Output transducer
20*a*, 20*b* Battery
22*a*, 22*b* Transceiver unit
24*a*, 24*b* Impulse noise suppression
26*a*, 26*b* Amplifier
28*a*, 28*b*, 28*a*', 28*b*' Attenuation curve
30*a*, 30*b* Minimum value
32*a*, 32*b* Average value
34*a*, 34*b* Limitation value
36 Limitation value

The invention claimed is:

1. A method for operating a binaural hearing device having two individual devices, wherein the individual devices in each case have:

at least one input transducer for receiving an acoustic signal and for converting the acoustic signal into a multi-channel input signal;

an impulse noise suppression for generating an attenuation curve to reduce impulse noise signal levels in the multi-channel input signal;

an amplifier for multi-channel signal amplification of the multi-channel input signal and for generating an output signal on a basis of the attenuation curve;

an output transducer for converting the output signal into a sound signal; and a transceiver unit for signal coupling between the individual devices;

the method comprises the steps of:

determining in a first one of the individual devices, a first scalar limitation value from the attenuation curve of the first one of the individual devices, and determining, in a second one of the individual devices, a second scalar limitation value from the attenuation curve of the second one of the individual devices;

communicating the first scalar limitation value to the second one of the individual devices, and communicating the second scalar limitation value to the first one of the individual devices;

determining a common limitation value from the first scalar limitation value and from the second scalar limitation value;

limiting the attenuation curve of the first one of the individual devices with the common limitation value and limiting the attenuation curve of the second one of the individual devices with the common limitation value; and setting signal amplification in the first one of the individual devices on a basis of the limited attenuation curve of the first one of the individual devices, and setting signal amplification in the second one of the individual devices on a basis of the limited attenuation curve of the second one of the individual devices.

2. The method according to claim 1, which further comprises setting the common limitation value to a stored default value after a predefined time period.

3. The method according to claim 1, which further comprises defining the common limitation value by averaging the first scalar limitation value and the second scalar limitation value.

4. The method according to claim 1, which further comprises defining an average value and a minimum value of the attenuation curve of the first one of the individual devices on a basis of the attenuation curve of the first one of the individual devices, and defining an average value and a minimum value of the attenuation curve of the second one of the individual devices on a basis of the attenuation curve of the second one of the individual devices.

5. The method according to claim 4, which further comprises determining the first scalar limitation value such that the first scalar limitation value lies between the average value and the minimum value of the attenuation curve of the first one of the individual devices, and determining the second scalar limitation value such that the second scalar limitation value lies between the average value and the minimum value of the attenuation curve of the second one of the individual devices.

6. The method according to claim 4, which further comprises determining the first scalar limitation value by summing the minimum value and the average value of the attenuation curve of the first one of the individual devices, and determining the second scalar limitation value by summing the minimum value and the average value of the attenuation curve of the second one of the individual devices.

7. The method according to claim 4, which further comprising modifying the average value and the minimum value of the attenuation curve of the first one of the individual devices and modifying the average value and the minimum value of the attenuation curve of the second one of the individual devices by a weighting factor in order to define the common limitation value.

8. The method according to claim 7, wherein the weighting factor is dimensioned between zero and one.

9. A binaural hearing device, comprising:

two individual devices, each of said individual devices in each case containing:

at least one input transducer for receiving an acoustic signal and converting the acoustic signal into a multi-channel input signal;

impulse noise suppression for generating an attenuation curve to reduce impulse noise signal levels in the multi-channel input signal;

an amplifier for multi-channel signal amplification of the multi-channel input signal and for generating an output signal on a basis of the attenuation curve;

an output transducer for converting the output signal into a sound signal;

a transceiver unit for a signal coupling between said individual devices; and a controller for carrying out a method according to claim 1.

10. A non-transitory data medium carrying computer executable instructions which when executed on a processor carry out a method according to claim 1.

* * * * *